United States Patent [19]

Creyf

[11] 4,391,926
[45] Jul. 5, 1983

[54] SOIL STABILIZERS AND THEIR PREPARATION

[75] Inventor: Hubert S. Creyf, Brugge, Belgium

[73] Assignee: S.A. PRB n.v., Woluwe-St.-Pierre, Belgium

[21] Appl. No.: 254,686

[22] Filed: Apr. 16, 1981

Related U.S. Application Data

[63] Continuation of Ser. No. 83,710, Oct. 11, 1979, abandoned.

[30] Foreign Application Priority Data

Oct. 11, 1978 [BE] Belgium ................................. 191048

[51] Int. Cl.$^3$ ............................................. C08L 75/08
[52] U.S. Cl. .................................... 523/132; 106/900; 524/591; 405/264
[58] Field of Search .................. 260/29.2 TN, 29.2 R, 260/DIG. 14; 528/66, 65; 405/264; 106/900; 523/132; 524/157, 158, 161, 166, 243, 591

[56] References Cited

U.S. PATENT DOCUMENTS

| | | | |
|---|---|---|---|
| 2,968,575 | 1/1961 | Mallonee | 260/29.2 TN |
| 4,061,618 | 12/1977 | Stanley et al. | 260/29.6 NR |
| 4,180,491 | 12/1979 | Kim et al. | 260/29.2 TN |

FOREIGN PATENT DOCUMENTS 1322490  7/1973  United Kingdom .

*Primary Examiner*—Theodore E. Pertilla
*Attorney, Agent, or Firm*—Sughrue, Mion, Zinn, Macpeak & Seas

[57] ABSTRACT

A soil stabilizer based on a prepolymer with terminal isocyanate groups, obtained by reaction of polyol with a stoichiometric excess of polyisocyanate, said prepolymer being such that in water a substantially stable dispersion of polyurea polymer particles is formed in the presence of a surface-active product.

28 Claims, No Drawings

SOIL STABILIZERS AND THEIR PREPARATION

This is a continuation of application Ser. No. 083,710, filed Oct. 11, 1979 now abandoned.

BACKGROUND OF THE INVENTION

1. Field of the Invention

This invention relates to a product for soil stabilizing, made up of a prepolymer with terminal isocyanate groups, obtained by reaction of a polyol with a stoichiometric excess of polyisocyanate.

2. The Description of the Prior Art

Various products for stabilizing soils are already on the market.

These products are used as a solution or emulsion.

However, many of these soil stabilizers present disadvantageous side properties, such as phytotoxicity, lack of biodegradability and the like.

Other soil stabilizers are difficult to use in practice. This is for example the case with soil stabilizers known from British Pat. No. 1,322,490.

This British patent concerns soil stabilizers based on urethane prepolymers to which water has to be added in order to form polyurea polymers which can then be spread on the soil.

Such prepolymers can be represented as follows:

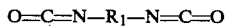

$$O=C=N-R_1-N=C=O$$

wherein R is a polyalkylene oxide chain with a minimum of 70% of ethylene oxide.

In the presence of water, the prepolymer is transformed into a polyurea polymer according to following reactions:

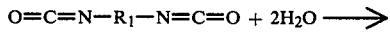

$$O=C=N-R_1-N=C=O + 2H_2O \longrightarrow$$

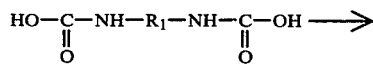

$$HO-\underset{\underset{O}{\|}}{C}-NH-R_1-NH-\underset{\underset{O}{\|}}{C}-OH \longrightarrow$$

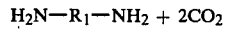

$$H_2N-R_1-NH_2 + 2CO_2$$

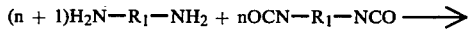

$$(n+1)H_2N-R_1-NH_2 + nOCN-R_1-NCO \longrightarrow$$

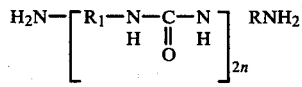

$$H_2N-\left[R_1-\underset{H}{N}-\underset{\underset{O}{\|}}{C}-\underset{H}{N}\right]_{2n} RNH_2$$

Such prepolymers are of a hydrophile character in order to ensure their solubility in water, with the consequence, however, that when diluted with water, the formed polymers gel after a few minutes. Due to the fact that such agar-like gels are no longer usable, it is necessary in order to be able to apply such stabilizers on the soil, to use a sophisticated two-component apparatus which precisely meters prepolymer and water, mixes them and immediately spread them on the soil.

Another drawback of these known prepolymers of high ethylene oxide content is their relatively high solidification point so that it is necessary in most cases to use diluent agents in order to maintain the prepolymer in a liquid state at normal temperatures of use.

Another drawback is also that such gelled polyurea polymers have low adhesion properties, which does not facilitate formation of aggregates of the soil particles to be stabilized.

SUMMARY OF THE INVENTION

The present invention has for its object to provide a soil stabilizer which allows to prevent these various drawbacks.

To this end, the soil stabilizer according to the invention is made up of a prepolymer which is such that it forms in water, in the presence of a surface-active product, a substantially stable dispersion of polyurea polymer particles.

The term "dispersion" means in this description a distribution of particles in suspension in a liquid, the particles can be as well solid as liquid and can have relatively different sizes.

Suitably the polyol from which the prepolymer of the soil stabilizer according to the invention is formed is comprised of one or more polyols with hydrophobe and hydrophile groups, wherein the weight ratio between the total amount of hydrophobe units and the total amount of hydrophile units in the total polyol quantity is between 30/70 and 90/10.

The invention is also relating to a process for preparing said soil stabilizer.

The process is characterized by the fact that said prepolymer is allowed to react with water in the presence of a surface-active product until a stable dispersion of polyurea polymer particles is formed.

Other features and advantages of the invention will become apparent from the following description.

DESCRIPTION OF THE INVENTION

The soil stabilizer according to the invention which is based on urethane prepolymer has a lowered hydrophile character so that no gel but a precipitate is formed when this prepolymer is added to water in order to be converted into a polyurea polymer. In order to be able to spread this soil stabilizer in a simple way on the soil in relatively diluted condition, this stabilizer moreover comprises suitable surface-active products in order to maintain the polyurea polymer particles in dispersion, so that necessary water can be added thereto without danger of precipitate formation.

The lowered hydrophile character of the involved soil stabilizer is determined by the relatively high content of hydrophobe groups in the polyol, which forms said prepolymer through reaction with a stoichiometric excess of polyisocyanate.

This polyol is made up of one or more polyols wherein the weight ratio between the total amount of hydrophobe units and the total amount of hydrophile units in the total quantity of polyol is between 30/70 and 90/10.

The hydrophile character of the polyol is mainly determined by ethylene oxide groups present, while the hydrophobe character is for example determined by propylene oxide groups present.

The total content of polypropylene oxide in the polyol is thus between 30 and 90% of the total quantity of polyol.

A preference is however given to an amount between 50 and 80% by weight of the total amount of polyol.

Furthermore the polyol is preferably of a total molecular weight between 1500 and 6000, more preferably between 2000 and 4000.

In some specific cases, the polyol can be made up of at least two different polyols one of which has a molecular weight between 1500 and 6000 while the other polyol has a molecular weight between 60 and 2000, preferably between 500 and 1500, the total molecular weight being however always within the hereinabove mentioned limits.

Furthermore, the amount of terminal free isocyanate groups is of 1 to 10% by weight, preferably of 2 to 6% by weight of the prepolymer.

The quantity of surface-active product which is contained in the soil stabilizer varies according to the kind of the product and is between 0.01 and 20% by weight of the prepolymer amount.

For preparing the soil stabilizer according to the invention, a polyurethane prepolymer is formed by reacting a polyalkylene oxide with a stoichiometric excess of polyisocyanate. Aliphatic or aromatic isocyanates can be used to this end on condition that they comprise at least two isocyanate groups. Amongst others, following polyisocyanates can be used: hexamethylene diisocyanate, isophorone diisocyanate, mixtures of isomers of toluene diisocyanate, naphthalene diisocyanate, triphenylmethane diisocyanate and diphenylmethane diisocyanates. It is obvious that mixtures of polyisocyanates can also be used.

The polyalkylene oxide preferably comprises at least two terminal hydroxy groups. The molecular weight is, as already mentioned hereinabove, between 1500 and 6000, preferably between 2000 to 4000. The polyalkylene oxide comprises a difunctional or polyfunctional initiator such as for example water, ethylene glycol, dipropylene glycol, trimethylpropane, quadrol of ethylenediamine, whereby ethylene oxide units and hydrophobe groups such as for example propylene oxide units are copolymerised. The sequence of this polymerisation is a random or block polymerisation, preferably a random one.

Optionally a second polyalkylene oxide is added, the molecular weight of which is between 60 and 2000, preferably between 500 and 1500. This second polyalkylene oxide must also be difunctional or polyfunctional. It is obvious that more than two polyols can be used in order to react with a polyisocyanate.

It is important that the weight ratio between the total amount of hydrophobe groups, such as for example propylene oxide, butylene oxide, styrene oxide, epichlorohydrin and the like, and the total amount of hydrophile ethylene oxide in the total quantity of polyol is between 30/70 and 90/10. It two polyols are used, the second polyol of polyalkylene oxide can for example be deprived of hydrophobe groups on condition that the first polyol comprises enough groups of this kind in order to meet the hereinabove mentioned conditions.

The final content of propylene oxide in the polyalkylene oxide in the total polyol mixture if several polyols are used, is preferably between 30 and 90% by weight, more preferably between 50 and 80% by weight as calculated on the total weight of polyalkylene oxide in the polyol. The weight ratio of the polyalkylene oxide/polyisocyanate is selected so that after complete reaction an excess of 1 to 10%, preferably between 2 to 6% by weight of free isocyanate groups with respect to the prepolymer remains unreacted. The preparation of the prepolymer is based on the traditional known method, namely: the polyisocyanate is added with slow stirring to the polyol or the polyol mixture which is maintained at a temperature above its melting temperature. The mixture is heated for a few hours to temperatures between 80° and 185° C. The reaction can be accelerated by addition of catalysts of the amine kind and can also negatively be catalysed by known additives, such as benzoyl chloride. In the latter case, the reaction period and the reaction temperature are to be adjusted.

If wished, according to the invention, an amount of solvent or diluent is added to the prepolymer, which does not substantially contain any active hydrogen.

After the prepolymer has been prepared in such a way according to traditional methods, 0.01 to 20% by weight of surface-active product is added thereto. This surface-tensive product must be water-free as much as possible and preferably soluble in the prepolymer. As surface-active product, use may be made of all nonionic and anionic types or mixtures thereof. In particular, surface-active products of the following type are suitable:

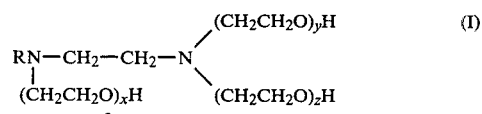

wherein $x + y + z = 3$ or of the type:

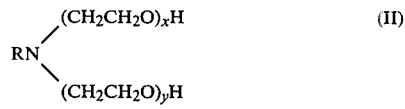

wherein R is an alkyl group with 12 to 16 carbon atoms and $x+y=11$ whereby the average molecular weight is of the order of 700.

According to the invention, the emulsifiers of the anionic type having following formulas are particularly interesting:

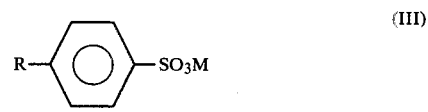

wherein R is an alkyl group of 9 to 13 carbon atoms

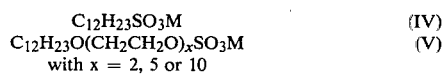

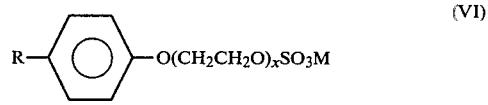

wherein R is an alkyl group having 8 to 12 carbon atoms, and $x=3, 7$ or 11. In these various formulas (III) to (VI), M represents a metal ion.

Also linear and ramified aryl alkyl sulfonates comprising as counter-ion, trielthanolamine or a metal such as $Na^+$ or $Ca^{++}$ can be used as surface-active product.

The mixture of prepolymer and surface-active product, optionally with solvent, is mixed in situ with water in a weight ratio of 1 to 20, preferably of 2 to 10 parts of prepolymer to 100 parts of water. Distilled water as well as ordinary tap-water may be used. By addition of water a milk-like dispersion results which remains stable for at least 1 week under normal conditions.

The invention is more completely illustrated hereinafter by some examples.

EXAMPLE I

One starts from 500 gr of a diol of a molecular weight of 5000, having two terminal OH groups, this diol being comprised of an initiator such as ethylene glycol, wherein 25% by weight of propylene oxide and 75% by weight of ethylene oxide are randomly copolymerised. This diol is mixed at 50° C. with 100 gr of a second diol of a functionality of 2 and of a molecular weight of 600, this diol being also comprised of 25% by weight of propylene oxide and 75% by weight of ethylene oxide which have been randomly copolymerised.

To the mixture of diols, 182,6 gr of 2.4 toluene diisocyanate (T80) are added. The temperature is raised to 90° C. The reaction of the diols with the isocyanate is carried out under mild conditions. After 2 hours, the temperature is lowered to 70° C. and 150 gr of 2-butanone are added. After suitable mixing, a prepolymer having a free isocyanate (NCO) content of about 6.5% by weight is obtained.

If the prepolymer so obtained from Example I which has thus been prepared from a mixture of polyols comprising 75% by weight of ethylene oxide and 25% by weight of propylene oxide is mixed with water in a ratio of 6 gr of prepolymer to 100 gr of water, a gel occurs after a few minutes but no stable dispersion. Example I is thus not an Example according to the invention.

EXAMPLE II

To 600 gr of polyol of a functionality of 2 and of a molecular weight of 3000, and containing an initiator whereby 80% by weight of preopylene oxide and 20% by weight of ethylene oxide are randomly copolymerised, 60 gr of a second polyol are added, this polyol being of a functionality of 2 but of a molecular weight of 1000 and containing 30% by weight of propylene oxide and 70% by weight of ethylene oxide, again randomly copolymerised. The total mixture of the two polyols comprises about 75.5% of propylene oxide. To these polyols, 127.6 gr of hexamethylene diisocyanate are added and then the mixture is brought to 120° C. over 2,5 hours.

Thereafter the temperature is brought to 50° C. and 85 gr of 1.1.1-trichloroethane are added. After mixing, the product is cooled to room temperature. The percentage of free isocyanate groups is about 4.5%.

If the so obtained prepolymer formed from polyols which as a total comprise 75% by weight of propylene oxide is mixed with calcium aryl alkyl sulfonate as surface-active material, in a ratio of 8 gr of sulfonate to each 100 gr of the prepolymer, and if then 7 gr of this mixture is mixed with 100 gr of water, a white dispersion having a blue Tyndall effect results, which is stable for more than 1 week.

EXAMPLE III

One starts from three polyols of a functionality of 2. The first polyol has a molecular weight of 4000 and comprises an initiator whereby 95% by weight of propylene oxide and 5% by weight of ethylene oxide are copolymerised. The second polyol has a molecular weight of 2000 and comprises 80% by weight of propylene oxide and 20% by weight of ethylene oxide in its chain, while the third polyol has a molecular weight of 1000 and comprises about 50% by weight of propylene oxide and 50% by weight of ethylene oxide in its chain. 450 gr, 105 gr and 45 gr respectively of these polyols are mixed at 50° C. The mixture comprises about 89% by weight of propylene oxide.

To this mixture, 178.7 gr of toluene diisocyanate (T80) are added and then the temperature of the mixture is brought to 95° C. for about 2,5 hours. Then, 80 gr of glycerine triacetate are added and the mixture is then allowed to cool to room temperature. The content of free isocyanate groups is about 7.5% by weight.

If with the so prepared prepolymer obtained from polyols comprising 89% by weight of propylene oxide, a surface-active product is mixed in a ratio of 7 gr of surface-active product of the kind of formula (II) wherein R is an alkyl group of 14 carbon atoms to 100 gr of prepolymer and if then 5 gr of this mixture is mixed with 100 gr of water, then a dispersion results, which however on standing settles a small fluffy precipitate.

The importance of the weight ratio of propylene oxide/ethylene oxide in the polyols used for preparing the prepolymer thus appears as important.

Concerning the ratio, the prepolymers according to Example I and Example III are limit cases while the ratio used when preparing the prepolymer according to Example II allows a very long stability of the dispersion to be obtained. Less than 25% by weight of propylene oxide in the polyols from which the prepolymer is prepared and more than 89% by weight of propylene oxide in the polyols cause the stability of the dispersion of prepolymer with surface-active materials to be strongly lowered.

The stability of the dispersion without precipitate or gel formation can be important for some applications. One of the application of the hereinabove described prepolymers is stabilization of soils. The prepolymer comprising a surface-active product is mixed in situ with water, so that a dispersion of a polyurea polymer is formed. This dispersion is diluted with water and can remain stable for 1 week at the minimum.

With a simple device, the dispersion can be spread on the soil to be stabilized, whereby after evaporation of water, a stable aggregate formation is discernible. The polymer so formed is not phytotoxic and well biodegradable.

From the preceding it becomes apparent that the main object of the invention is to provide a soil stabilizer made up of a prepolymer based on a polyol presenting a suitable balance of hydrophile and hydrophobe alkylene oxide units, the hydrophobe character of which is such that the formed polyurea polymer is water insoluble, while the hydrophile character is sufficient in order to maintain in dispersion the insoluble polyurea polymer with the help of surface-active materials.

According to the invention, it has been found that by a suitable choice of the relative amount of hydrophobe groups in the polyol, it is possible to provide a soil stabilizer wherein the water-formed polyurea polymer forms a kind of dispersion of polyurea polymer particles, rather than an effective solution, which is water-repellent enough in order to form a precipitate instead of a gel, whereby however, due to the presence of surface-active materials, the formation of this precipitate can sufficiently be delayed in order to allow this water dispersion to be spread over the soil to be stabilized by means of a simple device.

The invention is in no way limited to the hereinabove described embodiments and many changes can be made without departing from the scope of the invention.

In particular, the hydrophobe groups of the polyol must not necessarily be propylene oxide but can also be other hydrophobe groups, such as for example butylene oxide, styrene oxide, epichlorohydrin and the like.

Furthermore, it is important to note that the invention also relates to the soil stabilizer made up of the hereinabove described prepolymer which gives in water and in the presence of a surface-active product the above-described dispersion of polyurea polymer particles, and also to a soil stabilizer made up of said prepolymer, a surface-active product and possibly a diluent, which for use has to be added to water, the invention also relating to a soil stabilizer which is formed of the dispersion itself of these polyurea polymer particles in water in the presence of a surface-active product and optionally a diluent.

I claim:

1. A soil stabilizer in the form of an aqueous composition which comprises water as a dispersion medium, a dispersed polyurea polymer, the polyol component of which consists of one or more polyols with hydrophobic and hydrophilic groups in a weight ratio between 30/70 and 90/10 and with an average molecular weight of 1500 to 6000 and a surface active product selected from the group consisting of: a compound of formula (I):

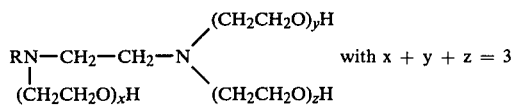

wherein R is an alkyl group with 12 to 16 carbon atoms; or a linear or ramified hydrocarbon sulfonate, optionally containing ethoxy units; or a compound of formula (II):

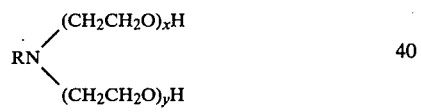

wherein R is an alkyl group with 12 to 16 carbon atoms and $x+y=11$, so that the average molecular weight is of the order of 700, said soil stabilizer being a stable, non-gel dispersion of particles of said polyurea polymer in said water.

2. A soil stabilizer as claimed in claim 1, characterized in that the polyol comprises ethylene oxide and propylene oxide groups as hydrophile and hydrophobe units respectively.

3. A soil stabilizer as claimed in claim 2, characterized in that the polyol comprises butylene oxide and/or styrene oxide and/or epichlorohydrin as hydrophobe units.

4. A soil stabilizer as claimed in claim 2, characterized in that the polyol comprises a polyalkylene oxide which comprises polypropylene oxide and polyethylene oxide in such an amount that the total content of polypropylene oxide, with respect to the total amount of polyol, is between 30 and 90% by weight of this total amount of polyol.

5. A soil stabilizer as claimed in claim 4, characterized in that the polyol comprises polyalkylene oxide comprised of polypropylene oxide and polyethylene oxide in such an amount that the total content of polypropylene oxide, with respect to the total amount of polyol, is between 50 and 80% by weight of this total amount of polyol.

6. A soil stabilizer as claimed in claim 1, characterized in that the polyol comprises a polyalkylene oxide of a total molecular weight between 1000 and 4000.

7. A soil stabilizer as claimed in claim 6, characterized in that the polyol is comprised of at least two different polyols one of which has a molecular weight between 1500 and 6000 while the other one has a molecular weight between 60 and 2000.

8. A soil stabilizer as claimed in claim 7, characterized in that said other polyol has a molecular weight between 500 and 2000.

9. A soil stabilizer as claimed in claim 1, characterized in that an amount of free isocyanate groups in the polymer is between 1 and 10% by weight of this polymer.

10. A soil stabilizer as claimed in claim 1, characterized in that the amount of surface-active product is between 0.01 and 20% by weight of the polymer amount.

11. A process for preparing the soil stabilizer as claimed in claims 1, characterized in that said prepolymer is allowed to react with water in the presence of a surface-active product until a stable dispersion of polyurea polymer particles is formed.

12. A process as claimed in claim 11, characterized in that a diluent is added to the polymer before the latter is added to water.

13. A process as claimed in claim 11, characterized in that the prepolymer is added to water in a weight ratio of 1 to 20 parts to 100 parts of water.

14. A soil stabilizer according to claim 1, wherein the hydrocarbon sulfonate, optionally containing ethoxy units, is selected from the group consisting of compounds according to one of the following formulas:

wherein R is an alkyl group of 9 to 13 carbon atoms $C_{12}H_{23}SO_3M$ (IV) $C_{12}H_{23}O(CH_2CH_2)_xSO_3M$ (V) with $x=2, 5$ or $10$

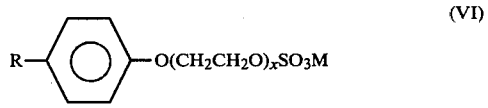

wherein R is an alkyl group having 8 to 12 carbon atoms, and $=3, 7$ or $11$, in these various formulas (III) to (VI), M representing a metal ion.

15. Soil stabilizers according to claim 1 wherein the hydrocarbon sulfonate, optionally containing ethoxy units, is an amino-salt of a sulfonacid.

16. A process for stabilizing soil, which comprises the steps of:

mixing with water a surface active agent and a prepolymer wherein said prepolymer has terminal isocyanate groups obtained by reaction of a stoichiometric excess of polyisocyanate with a polyol, the polyol consisting of one or more polyols with hydrophobic and hydrophilic groups in a weight ratio between 30/70 and 90/10 and with an average molecular weight of 1500 to 6000, said prepolymer containing hydrophilic and hydrophobic units balanced such that the polyurea polymer formed in the water is water insoluble but forms a substantially stable dispersion in the presence of the surface active agent thereby forming a stable aqueous non-gel dispersion of said polymer and further wherein said surface active agent is selected from the group consisting of:

a compound of formula (I):

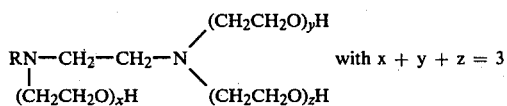

with $x + y + z = 3$ wherein R is an alkyl group with 12 to 16 carbon atoms; or a linear or ramified hydrocarbon sulfonate, optionally containing ethoxy units; or a compound of formula (II):

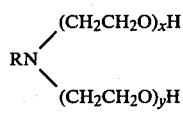

wherein R is an alkyl group with 12 to 16 carbon atoms and $X + Y = 11$, so that the average molecular weight is of the order of 700; and spreading said dispersion on soil.

17. A process for stabilizing soil as claimed in claim 16, wherein the hydrocarbon sulfonate, optionally containing ethoxy units, is selected from the group consisting of compounds according to one of the following formulas:

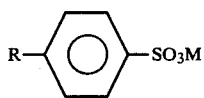   (III)

wherein R is an alkyl group of 9 to 13 carbon atoms $C_{12}H_{23}SO_3M$   (IV)

$C_{12}H_{23}O(CH_2CH_2)_xSO_3M$   (V)
with $x = 2, 5$ or $10$

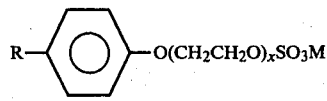   (VI)

wherein R is an alkyl group having 8 to 12 carbon atoms, and $x = 3, 7$ or $11$, in these various formulas (III) to (VI), M representing a metal ion.

18. A process for stabilizing soil as claimed in claim 16, where the hydrocarbon sulfonate, optionally containing ethoxy units, is an amino-salt of a sulfonacid.

19. The process as claimed in claim 16 wherein the polyol comprises ethylene oxide and propylene oxide units as the hydrophilic and hydrophobic units respectively.

20. The process as claimed in any of claims 16, 17 or 18, wherein the polyol comprises butylene oxide and/or styrene oxide and/or epichlorohydrin as hydrophobic units.

21. The process as claimed in claim 19 wherein the polyol comprises a polyalkylene oxide which is comprised of polypropylene oxide and polyethylene oxide in such amounts that the total polypropylene oxide content is about 30 to 90% by weight of the polyol.

22. The process as claimed in claim 21 wherein the polyol comprises a polyalkylene oxide comprised of polypropylene oxide and polyethylene oxide in amounts such that the total polypropylene oxide content is about 50 to 80% by weight based on the polyol.

23. The process as claimed in claim 16 wherein the polyol comprises a polyalkylene oxide having a molecular weight of about 1000 to 4000.

24. The process as claimed in claim 23 wherein the polyol is comprised of at least two different polyols one of which has a molecular weight of about 1500 to 6000 while the other has a molecular weight of about 60 to 2000.

25. The process as claimed in claim 24 wherein the lower molecular weight polyol has a molecular weight of about 500 to 2000.

26. The process as claimed in claim 16 wherein the free isocyanate group content of the polymer is about 1 to 10% by weight of the polymer.

27. The process as claimed in any of claims 16, 17 or 18 wherein the amount of surface-active agent is about 0.01 to 20% by weight of the polymer.

28. The process as claimed in claim 27 wherein the surface-active agent comprises a linear or ramified sulfonate.

* * * * *